US012728065B2

(12) United States Patent
Liufu

(10) Patent No.: US 12,728,065 B2
(45) Date of Patent: Sep. 8, 2026

(54) MASSAGER WITH KNEADING FUNCTION

(71) Applicant: Zengling Liufu, Huazhou (CN)

(72) Inventor: Zengling Liufu, Huazhou (CN)

( * ) Notice: Subject to any disclaimer, the term of this patent is extended or adjusted under 35 U.S.C. 154(b) by 365 days.

(21) Appl. No.: 18/636,287

(22) Filed: Apr. 16, 2024

(65) Prior Publication Data

US 2024/0252383 A1 Aug. 1, 2024

(51) Int. Cl.
*A61H 7/00* (2006.01)
*A61H 19/00* (2006.01)

(52) U.S. Cl.
CPC ............. *A61H 7/007* (2013.01); *A61H 19/34* (2013.01); *A61H 2201/1215* (2013.01); *A61H 2201/1418* (2013.01); *A61H 2201/169* (2013.01)

(58) Field of Classification Search
CPC ........ A61H 7/005; A61H 7/007; A61H 23/02; A61H 19/34; A61H 2201/1215; A61H 2201/1418; A61H 2201/169
See application file for complete search history.

(56) References Cited

U.S. PATENT DOCUMENTS

| | | | | |
|---|---|---|---|---|
| 6,251,089 | B1 * | 6/2001 | Kuznets | A61H 7/005 601/134 |
| 12,011,409 | B1 * | 6/2024 | Wang | A61H 19/40 |
| 12,161,598 | B1 * | 12/2024 | Wang | A61H 23/0263 |
| 2011/0105968 | A1 | 5/2011 | Angell et al. | |
| 2013/0023807 | A1 | 1/2013 | Hennessey | |
| 2023/0355466 | A1 | 11/2023 | Cheng | |
| 2024/0238155 | A1 * | 7/2024 | Huang | A61H 23/0254 |
| 2024/0252384 | A1 * | 8/2024 | Zhou | A61H 7/008 |
| 2024/0398656 | A1 * | 12/2024 | Zhong | A61H 9/0057 |
| 2025/0090412 | A1 * | 3/2025 | Chen | A61H 19/34 |

* cited by examiner

*Primary Examiner* — Douglas Y Sul
(74) *Attorney, Agent, or Firm* — Hemisphere Law, PLLC

(57) ABSTRACT

The present disclosure discloses a massager with a kneading function, and relates to the field of massage instruments. The massager includes a hard shell and a soft outer skin. A driving motor is arranged in the hard shell; a rotary table is fixedly mounted at a rotor of the driving motor; a motor fixing member is fixedly mounted in the hard shell. The present disclosure can simultaneously drive the several kneading rods when the driving motor is running, so as to allow top ends of the kneading rods to perform a kneading action, and the vibration motor is turned on at the same time, which improves the massage experience.

9 Claims, 5 Drawing Sheets

MASSAGER WITH KNEADING FUNCTION

TECHNICAL FIELD

The present disclosure relates to the field of massage instruments, and in particular, to a massager with a kneading function.

BACKGROUND

With the improvement of the living standard, people pay more and more attention to health-care massage. In order to meet the needs of the social public, various health-care massagers have emerged in the market to improve the blood circulation in human body parts to improve the physical health. These massagers can promote the blood circulation through rolling, vibration, heating, and the like. For example, massaging the neck, limbs, and extremities of the limbs of a person can promote the blood circulation in peripheral parts and play an auxiliary treatment role.

At present, there are different defects in use of massagers. For example, most massagers can only abut against the body of a user by manual cooperation. After long-term use, the user easily feels tired. This affects the comfort level of the user. In order to solve the technical problem, the prior art (No. CN216124796U, filed on Mar. 25, 2022) discloses a massager, which can preliminarily locate a part to be massaged through a massage channel in a seat body and massage the part to be massaged in the massage channel through a first massage device to improve the blood circulation in a peripheral part. Massaging a finger part is taken as an example. A radial depth of a first massage device that enters the massage channel is adjusted through a driving mechanism, so that the massage channel is partially tightened to abut against radial sizes of different human body parts. This massager is preliminarily fixed to the body, can be hand-free during massaging, and is convenient to use.

The above-mentioned massager needs to be fixed to a part that needs to be massaged. If the part to be massaged needs to be changed, this massager is very inconvenient because it needs to be removed and remounted. The massager has poor use experience due to the lack of the convenience of a muscle massage gun, resulting in a poor user experience: The massager appears to be inconvenient when massaging joints, muscles, and other tissues of the body. In addition, kneading is crucial during the massaging of joints, muscles, and other tissues of the body, but the massager mentioned above is not configured with a kneading action. As a result, the massage experience of the massager still needs to be improved.

SUMMARY

In order to overcome the drawbacks described above, the present disclosure provides a technical solution capable of solving the above problems.

A massager with a kneading function includes a hard shell and a soft outer skin; a driving motor is arranged in the hard shell; a rotary table is fixedly mounted at a rotor of the driving motor; a motor fixing member is fixedly mounted in the hard shell; the driving motor is fixedly mounted in the motor fixing member; the motor fixing member is located between the driving motor and the rotary table;

several kneading rods are mounted at a peripheral edge of an upper end of the hard shell in a hinged fitting manner; the several kneading rods are arranged in a circular array; inner ends of the several kneading rods are simultaneously pressed against an outer side of the rotary table;

reset tension springs are fixedly mounted between the inner ends of the kneading rods and the motor fixing member in a one-to-one correspondence manner;

a vibration motor is fixedly mounted in the middle of a bottom side of the hard shell; and the soft outer skin is wrapped outer sides of the hard shell, the vibration motor, and the several kneading rods.

As a further solution of the present disclosure, a cam driving surface is formed on the outer side of the rotary table; and the inner ends of the several kneading rods are simultaneously pressed against the cam driving surface.

As a further solution of the present disclosure, several first barbs are formed on an inner side of the motor fixing member; the several first barbs are arranged in a circular array; the several first barbs are arranged on inner sides of the kneading rods in a one-to-one correspondence manner; second barbs are formed at the inner ends of the kneading rods; and two ends of the reset tension springs are fixedly mounted on the first barbs and the second barbs respectively.

As a further solution of the present disclosure, a battery is fixedly mounted inside the hard shell; a magnetic suction charging end is embedded and mounted at a bottom end of the hard shell; the bottom end of the hard shell extends out of the soft outer skin; a printed circuit board (PCB) is fixedly mounted inside the hard shell; the battery controls the vibration motor and the driving motor to run through the PCB; and the magnetic suction charging end charges the battery through the PCB.

As a further solution of the present disclosure, the hard shell includes a left shell, a right shell, a top cover, and a bottom cover; the driving motor, the battery, and the PCB are all fixedly mounted between the left shell and the right shell; the left shell and the right shell are fixedly connected by a screw; the top cover is fixedly mounted at top ends of the left shell and the right shell by screws; the vibration motor is fixedly mounted in the middle of the top cover; and the bottom cover is buckled and mounted on outer sides of bottom ends of the left shell and the right shell.

As a further solution of the present disclosure, limiting slots are formed on the outer sides of the bottom ends of the left shell and the right shell; inverted convex edges are formed on an inner side of an upper end of the bottom cover; and the inverted convex edges are buckled into the limiting slots in a one-to-one corresponding clearance fit manner.

As a further solution of the present disclosure, the soft outer skin is wrapped and mounted on outer sides of the left shell, the right shell, the top cover, the vibration motor, and the several kneading rods; a folded edge is formed at an edge of a bottom end of the soft outer skin; mounting slots are formed on the outer sides of the bottom ends of the left shell and the right shell; the folded edge is arranged in the mounting slots in a clearance fit manner; and a top side edge of the bottom cover presses the folded edge to lock the soft outer skin.

As a further solution of the present disclosure, several hinge positions are formed on an inner side of the top cover; open holes are formed in inner sides of the hinge positions; and the bottom ends of the kneading rods extend into the open holes in a one-to-one correspondence manner.

As a further solution of the present disclosure, hinge shafts are formed on the outer sides of the bottom ends of the kneading rods; the hinge shafts are mounted in the hinge positions in a clearance fit manner; a positioning pressing plate is arranged on a bottom side of the top cover; and the positioning pressing plate presses the hinge shafts into the hinge positions.

As a further solution of the present disclosure, the soft outer skin is made of medical grade silicone.

Compared with the prior art, the present disclosure has the beneficial effects below: The driving motor drives the rotary table to rotate. The bottom ends of the several kneading rods are all pressed against the outer side of the rotary table. This is the same as the principle of a cam mechanism: When the driving motor runs, the several kneading rods can be simultaneously driven to swing to allow the top ends of the kneading rods to achieve a kneading effect. At the same time, the vibration motor is turned on to achieve a better massage experience. Vibration waves that are transferred in a radial direction can be obtained to improve the blood circulation in tissues. Meanwhile, recess parts at an upper end of the massager can abut against joints, muscles, and other tissues of the body to enhance the massage effect on the joints, muscles, and other tissues of the body.

The additional aspects and advantages of the present disclosure will be partially provided in the following descriptions, some of which will become apparent from the following descriptions, or learned through the practice of the present disclosure.

BRIEF DESCRIPTION OF THE DRAWINGS

To describe the technical solutions in the embodiments of the present disclosure or in the prior art more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the accompanying drawings without creative efforts.

Figure 1:
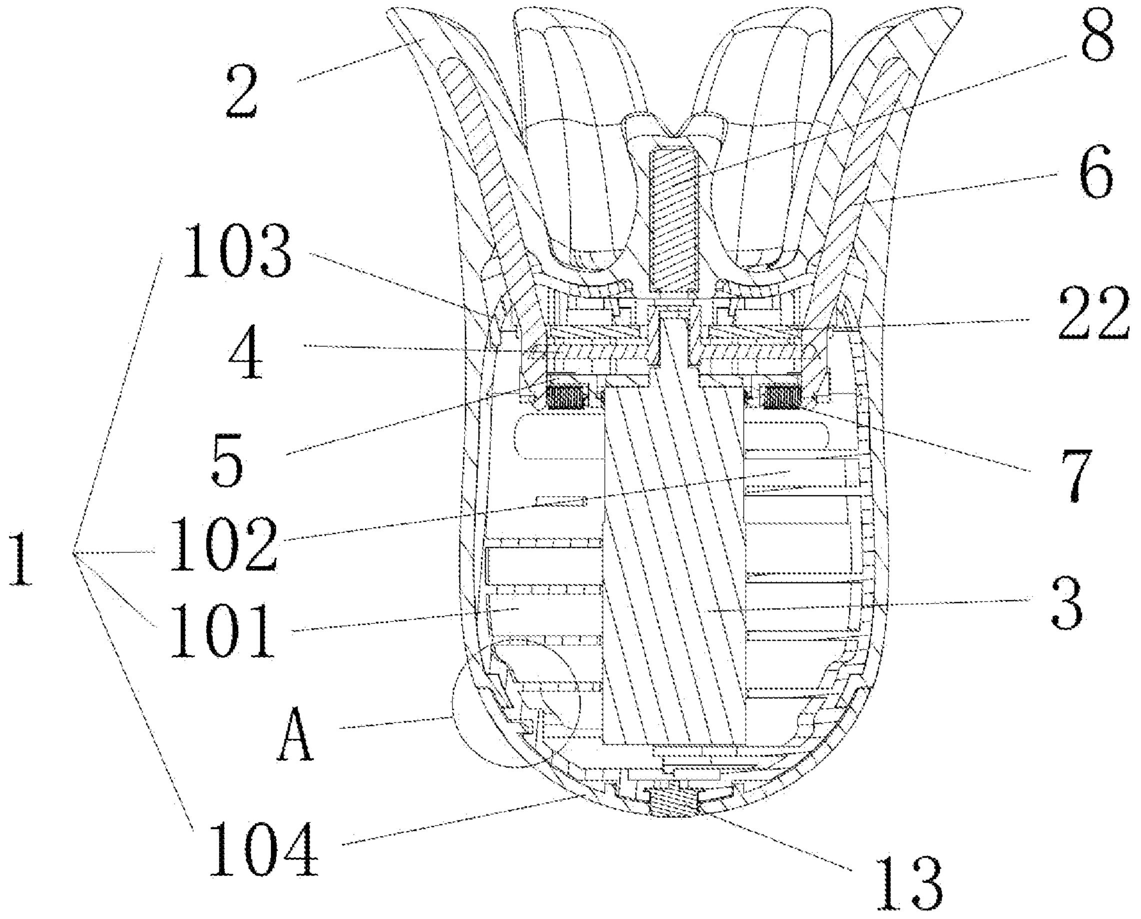
FIG. 1 is a schematic diagram of a cross-sectional structure of the present disclosure.

In the drawings: 1: hard shell; 101: left shell; 102: right shell; 103: top cover; 104: bottom cover; 2: soft outer skin; 3: driving motor; 4: rotary table; 5: motor fixing member; 6: kneading rod; 7: reset tension spring; 8: vibration motor; 9: cam driving surface; 10: first barb; 11: second barb; 12: battery; 13: magnetic suction charging end; 14: PCB; 15: limiting slot; 16: inverted convex edge; 17: folded edge; 18: mounting slot; 19: hinge position; 20: open hole; 21: hinge shaft; and 22: positioning pressing plate.

DETAILED DESCRIPTION OF THE EMBODIMENTS

The technical solutions of the present disclosure are clearly and completely described below in conjunction with the accompanying drawings. Apparently, the described embodiments are some embodiments of the present disclosure, rather than all of the embodiments.

Components of the embodiments of the present disclosure commonly described and shown in the accompanying drawings here may be arranged and designed in a variety of different configurations. Therefore, the following detailed descriptions of the embodiments of the present disclosure provided in the accompanying drawings are not intended to limit the scope of the claimed present disclosure, but merely represents selected embodiments of the present disclosure.

All other embodiments obtained by a person of ordinary skill in the art based on the embodiments of the present disclosure without making creative efforts shall fall within the protection scope of the present disclosure.

In the descriptions of the present disclosure, it should be noted that orientations or positional relationships indicated by the terms "center", "upper", "lower", "left", "right", "vertical", "horizontal", "inner", "outer", and the like are orientations or positional relationships as shown in the drawings, and are only for the purpose of facilitating and simplifying the descriptions of the present disclosure instead of indicating or implying that devices or elements indicated must have particular orientations, and be constructed and operated in the particular orientations, so that these terms are not construed as limiting the present disclosure. In addition, the terms "first", "second", and "third" are only for the purpose of description, and may not be understood as indicating or implying the relative importance.

In the description of the present disclosure, it should be noted that unless otherwise specified and limited, the terms "mount", "connect", and "connection" should be broadly understood. For example, it can be a fixed connection, detachable connection, integrated connection, mechanical connection, electrical connection, direct connection, indirect connection via an intermediate element, or internal communication between two elements. For those of ordinary skill in the art, the specific meanings of the aforementioned terms in the present disclosure can be understood based on specific conditions.

Figure 2:
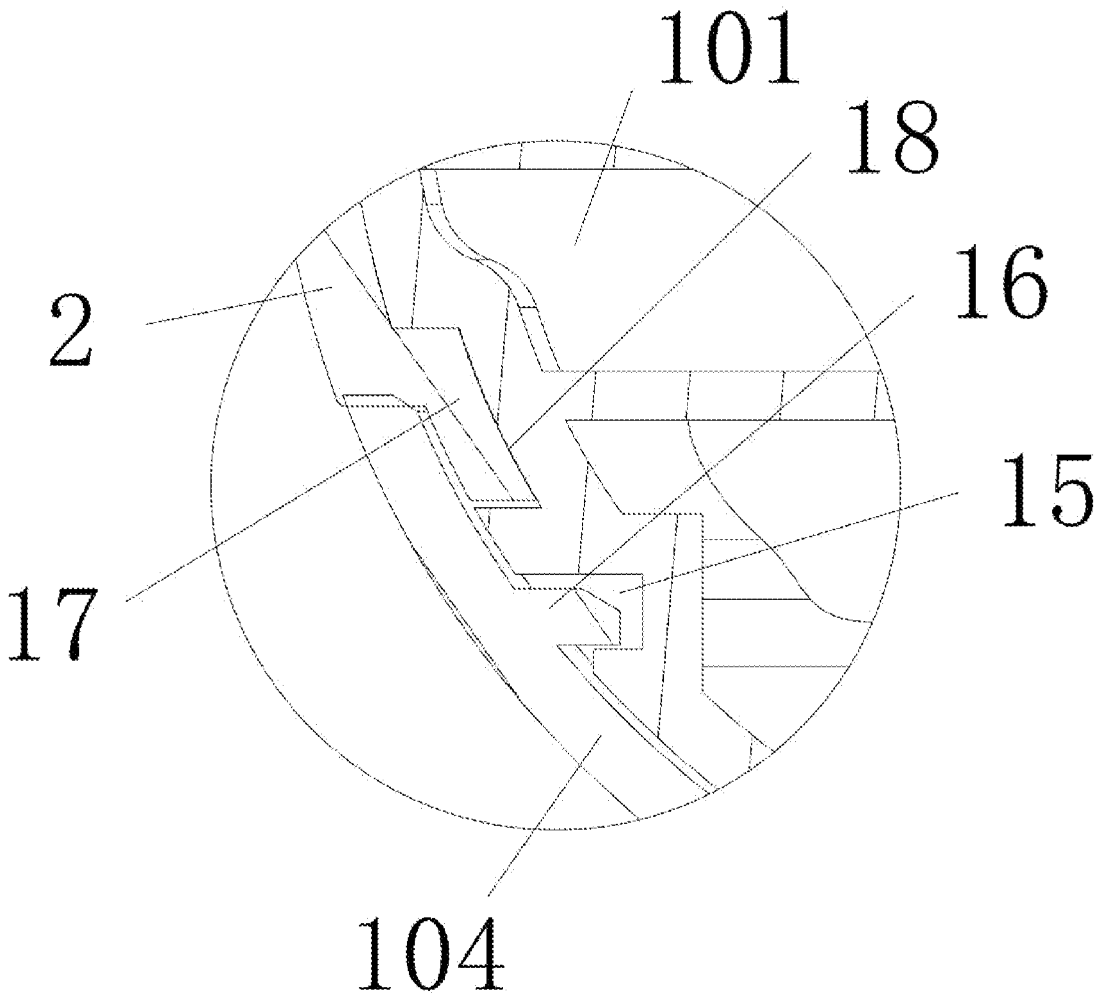
FIG. 2 is a schematic diagram of an enlarged structure of part A in FIG. 1.
Figure 3:
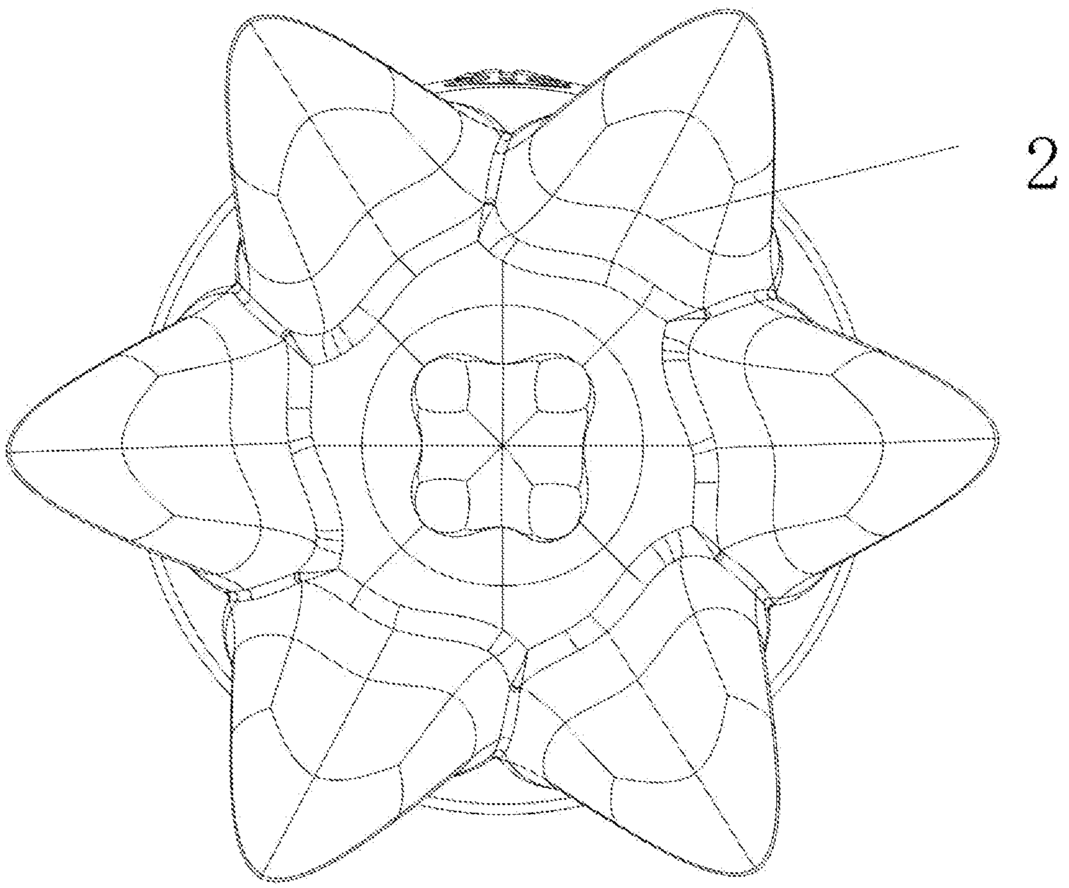
FIG. 3 is a schematic diagram of a top-view structure of the present disclosure.
Figure 4:
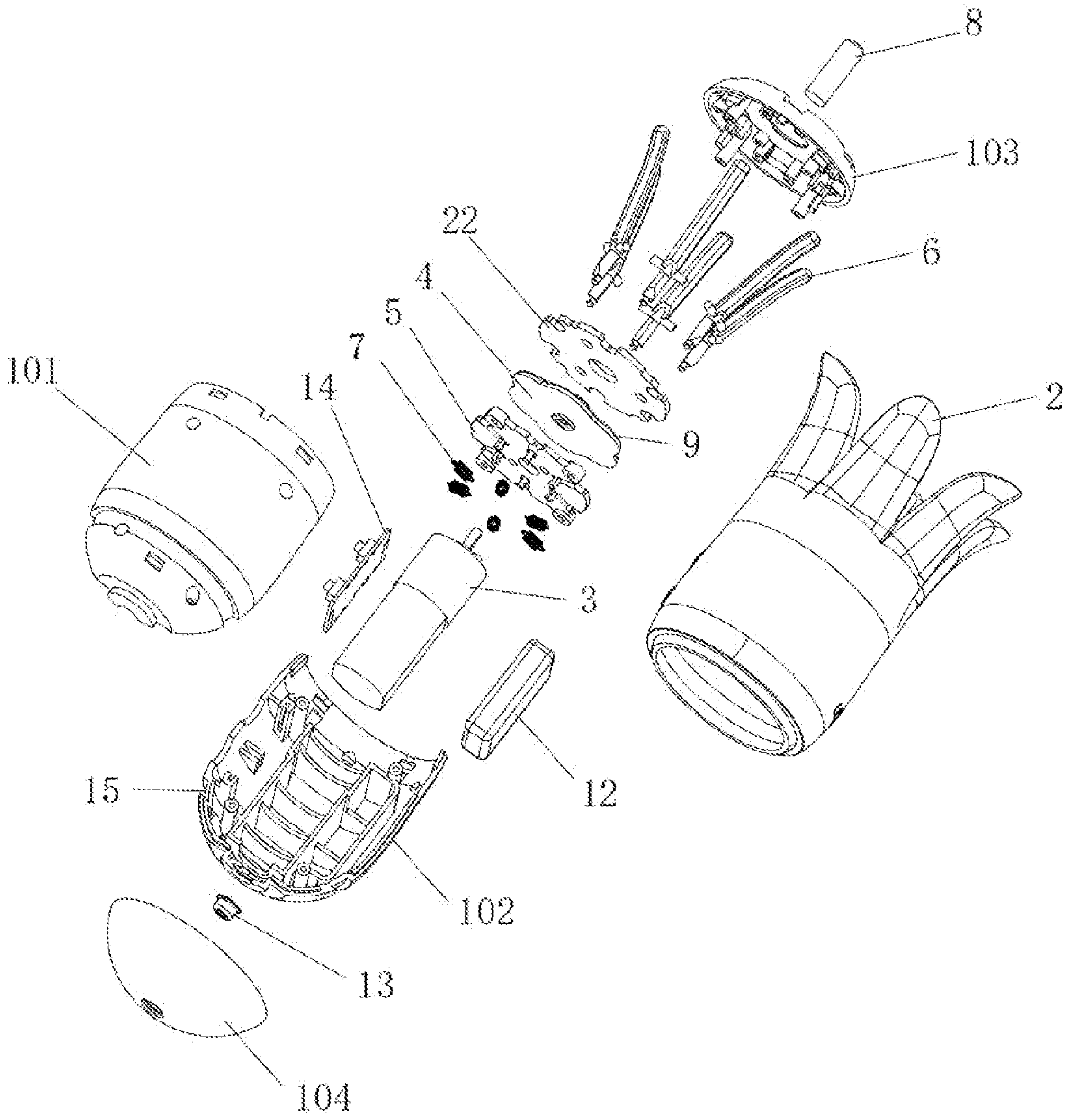
FIG. 4 is a schematic diagram of an exploded structure according to the present disclosure.
Figure 5:
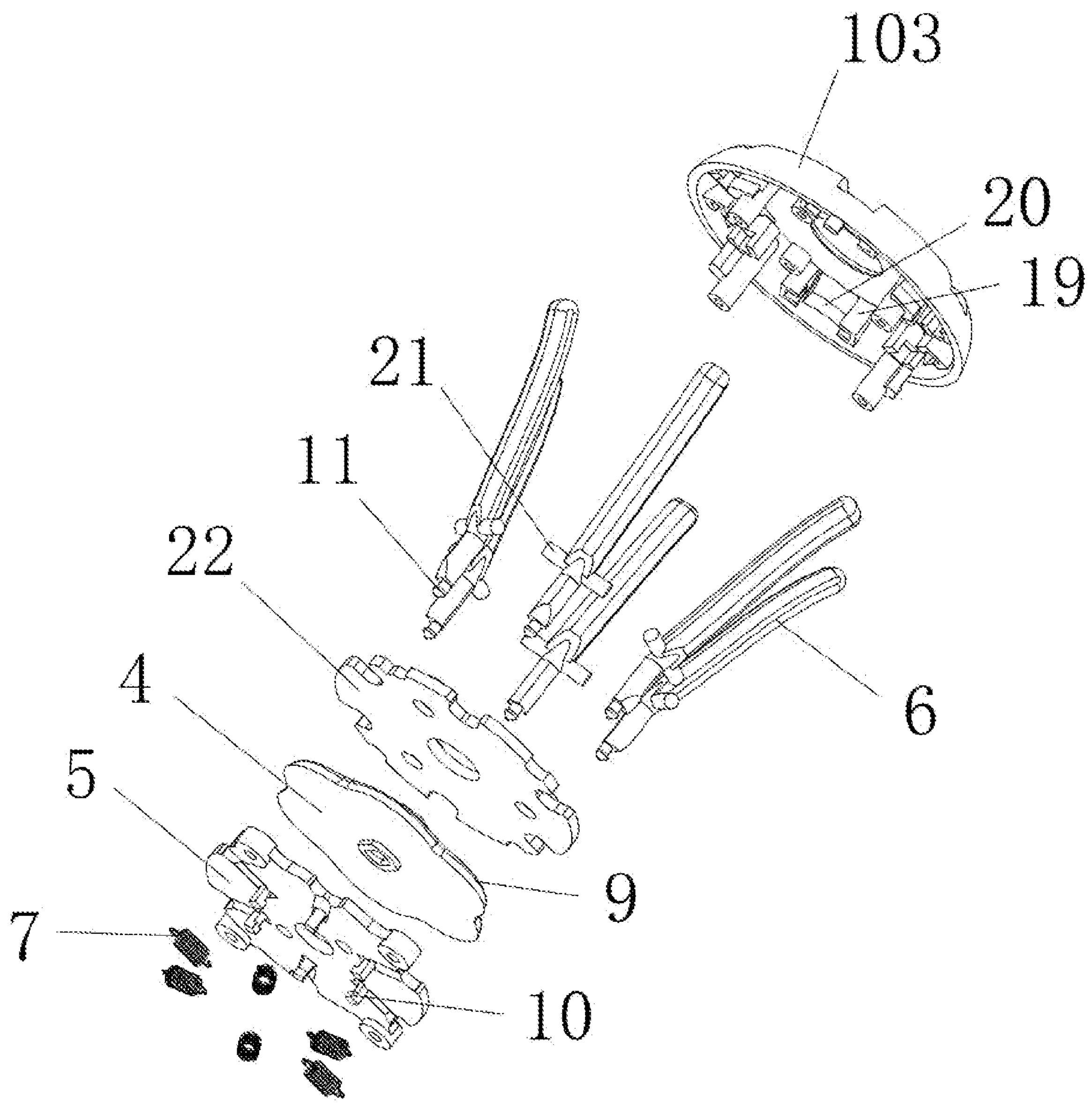
FIG. 5 is a schematic diagram of a mounting structure of kneading rods.

As shown in FIG. 1 to FIG. 5, a massager with a kneading function according to the present disclosure includes a hard shell 1 and a soft outer skin 2; a driving motor 3 is arranged in the hard shell 1; a rotary table 4 is fixedly mounted at a rotor of the driving motor 3; a motor fixing member 5 is fixedly mounted in the hard shell 1; the driving motor 3 is fixedly mounted in the motor fixing member 5; and the motor fixing member 5 is located between the driving motor 3 and the rotary table 4.

Several kneading rods 6 are mounted at a peripheral edge of an upper end of the hard shell 1 in a hinged fitting manner; the several kneading rods 6 are arranged in a circular array; and inner ends of the several kneading rods 6 are simultaneously pressed against an outer side of the rotary table 4.

Reset tension springs 7 are fixedly mounted between the inner ends of the kneading rods 6 and the motor fixing member 5 in a one-to-one correspondence manner.

A vibration motor 8 is fixedly mounted in the middle of a bottom side of the hard shell 1.

The soft outer skin 2 is wrapped outer sides of the hard shell 1, the vibration motor 8, and the several kneading rods 6.

The principle is as follows: The driving motor 3 drives the rotary table 4 to rotate. The bottom ends of the several kneading rods 6 are all pressed against the outer side of the rotary table 4. This is the same as the principle of a cam mechanism, when the driving motor 3 runs: The several kneading rods 6 can be simultaneously driven to swing to allow the top ends of the kneading rods 6 to achieve a kneading effect. At the same time, the vibration motor 8 is turned on to achieve a better massage experience. Vibration waves that are transferred in a radial direction can be obtained to improve the blood circulation in tissues. Meanwhile, recess parts at an upper end of the massager can abut joints, muscles, and other tissues of the body to enhance the massage effect on the joints, muscles, and other tissues of the body.

As a further solution of the present disclosure, a cam driving surface 9 is formed on the outer side of the rotary table 4; and the inner ends of the several kneading rods 6 are simultaneously pressed against the cam driving surface 9. The rotary table 4 can use the cam driving surface 9 to drive the several kneading rods 6 to swing to achieve the kneading effect. Like the principle of the cam mechanism, the reset tension springs 7 are used to allow the bottom ends of the kneading rods 6 to be always pressed against the cam driving surface 9, so that the stability is high, and the comfort level of kneading is improved.

As a further solution of the present disclosure, several first barbs 10 are formed on an inner side of the motor fixing member; the several first barbs 10 are arranged in a circular array; the several first barbs 10 are arranged on inner sides of the kneading rods 6 in a one-to-one correspondence manner; second barbs 11 are formed at the inner ends of the kneading rods 6; and two ends of the reset tension springs 7 are fixedly mounted on the first barbs 10 and the second barbs 11 respectively. The reset tension springs 7 are mounted more stably.

As a further solution of the present disclosure, a battery 12 is fixedly mounted inside the hard shell 1; a magnetic suction charging end 13 is embedded and mounted at a bottom end of the hard shell 1; the bottom end of the hard shell 1 extends out of the soft outer skin 2; a PCB 14 is fixedly mounted inside the hard shell 1; the battery 12 controls the vibration motor 8 and the driving motor 3 to run through the PCB 14; and the magnetic suction charging end 13 charges the battery 12 through the PCB 14. The built-in battery 12 can make the massager convenient to use, as the massager can be repeatedly used by charging. The PCB 14 is used to control the massager to be turned on and turned off.

As a further solution of the present disclosure, the hard shell 1 includes a left shell 101, a right shell 102, a top cover 103, and a bottom cover 104; the driving motor 3, the battery 12, and the PCB 14 are all fixedly mounted between the left shell 101 and the right shell 102; the left shell 101 and the right shell 102 are fixedly connected by a screw; the top cover 103 is fixedly mounted at top ends of the left shell 101 and the right shell 102 by screws; the vibration motor 8 is fixedly mounted in the middle of the top cover 103; and the bottom cover 104 is buckled and mounted on outer sides of bottom ends of the left shell 101 and the right shell 102. The assembling and production of the massager can be facilitated; the production efficiency is improved; and subsequent reworking can also be facilitated.

As a further solution of the present disclosure, limiting slots 15 are formed on the outer sides of the bottom ends of the left shell 101 and the right shell 102; inverted convex edges 16 are formed on an inner side of an upper end of the bottom cover 104; and the inverted convex edges 16 are buckled into the limiting slots 15 in a one-to-one corresponding clearance fit manner, so that the bottom cover 104 is mounted more stably.

As a further solution of the present disclosure, the soft outer skin 2 is wrapped and mounted on outer sides of the left shell 101, the right shell 102, the top cover 103, the vibration motor 8, and the several kneading rods 6; a folded edge 17 is formed at an edge of a bottom end of the soft outer skin 2; mounting slots 18 are formed on the outer sides of the bottom ends of the left shell 101 and the right shell 102; the folded edge 17 is arranged in the mounting slots 18 in a clearance fit manner; and a top side edge of the bottom cover 104 presses the folded edge 17 to lock the soft outer skin 2. After the bottom cover 104 is removed, the soft outer skin 2 can be gradually removed from the bottom, so that it is convenient for the mounting and removal of the soft outer skin 2. The soft outer skin 2 has the characteristics of being waterproof and skin-friendly, and the actual use experience of the massager is improved.

As a further solution of the present disclosure, several hinge positions 19 are formed on an inner side of the top cover 103; open holes 20 are formed in inner sides of the hinge positions 19; and the bottom ends of the kneading rods 6 extend into the open holes 20 in a one-to-one correspondence manner, so that it can be ensured that the kneading rods 6 are stably mounted in the hinge positions 19.

As a further solution of the present disclosure, hinge shafts 21 are formed on the outer sides of the bottom ends of the kneading rods 6; the hinge shafts 21 are mounted in the hinge positions 19 in a clearance fit manner; a positioning pressing plate 22 is arranged on a bottom side of the top cover 103; and the positioning pressing plate 22 presses the hinge shafts 21 into the hinge positions 19, so that the kneading rods 6 can be prevented from being loosened and moving.

As a further solution of the present disclosure, the soft outer skin 2 is made of medical silica gel. The soft outer skin has certain elasticity, is convenient to mount and remove, and has the characteristic of being skin-friendly, so that the massager has a better use experience.

This embodiment does not impose any formal limitations on the shape, material, structure, and the like of the present disclosure. Any simple modifications, equivalent changes, or embellishments made to the above embodiments according to the technical essence of the present disclosure shall all fall within the scope of protection of the technical solutions of the present disclosure.

What is claimed is:

1. A massager with a kneading function, comprising a hard shell and a soft outer skin, wherein a driving motor is arranged in the hard shell; a rotary table is fixedly mounted at a rotor of the driving motor; a motor fixing member is fixedly mounted in the hard shell; the driving motor is fixedly mounted in the motor fixing member; the motor fixing member is located between the driving motor and the rotary table;

a plurality of kneading rods are mounted at a peripheral edge of an upper end of the hard shell in a hinged fitting manner; the plurality of kneading rods are arranged in a circular array; inner ends of the plurality of kneading rods are simultaneously pressed against an outer side of the rotary table;

reset tension springs are fixedly mounted between the inner ends of each of the plurality of kneading rods and the motor fixing member in a one-to-one correspondence manner; a vibration motor; and the soft outer skin is wrapped over outer sides of the hard shell, the vibration motor, and the plurality of kneading rods;

wherein a cam driving surface is formed on the outer side of the rotary table; and the inner ends of the plurality of kneading rods are simultaneously pressed against the cam driving surface.

2. The massager with the kneading function according to claim 1, wherein a plurality of first barbs are formed on an inner side of the motor fixing member; the plurality of first barbs are arranged in a circular array; the plurality of first barbs are arranged on inner sides of the kneading rods in a one-to-one correspondence manner; second barbs are formed at the inner ends of the kneading rods; and two ends of the reset tension springs are fixedly mounted on the first barbs and the second barbs, respectively.

3. The massager with the kneading function according to claim 1, wherein a battery is fixedly mounted inside the hard shell; a magnetic suction charging end is embedded and mounted at a bottom end of the hard shell; the bottom end of the hard shell extends out of the soft outer skin; a printed circuit board (PCB) is fixedly mounted inside the hard shell; the battery controls the vibration motor and the driving motor to run through the PCB; and the magnetic suction charging end charges the battery through the PCB.

4. The massager with the kneading function according to claim 3, wherein the hard shell comprises a left shell, a right shell, a top cover, and a bottom cover; the driving motor, the battery, and the PCB are all fixedly mounted between the left shell and the right shell; the left shell and the right shell are fixedly connected by a screw; the top cover is fixedly mounted at top ends of the left shell and the right shell by screws; the vibration motor is fixedly mounted in the middle of the top cover; and the bottom cover is buckled and mounted on outer sides of bottom ends of the left shell and the right shell.

5. The massager with the kneading function according to claim 4, wherein limiting slots are formed on the outer sides of the bottom ends of the left shell and the right shell; inverted convex edges are formed on an inner side of an upper end of the bottom cover; and the inverted convex edges are buckled into the limiting slots in a one-to-one corresponding clearance fit manner.

6. The massager with the kneading function according to claim 5, wherein the soft outer skin is wrapped and mounted on outer sides of the left shell, the right shell, the top cover, the vibration motor, and the plurality of kneading rods; a folded edge is formed at an edge of a bottom end of the soft outer skin; mounting slots are formed on the outer sides of the bottom ends of the left shell and the right shell; the folded edge is arranged in the mounting slots in a clearance fit manner; and a top side edge of the bottom cover presses the folded edge to lock the soft outer skin.

7. The massager with the kneading function according to claim 4, wherein a plurality of hinge portions are formed on an inner side of the top cover; open holes are formed in inner sides of the hinge positions; and the bottom ends of the kneading rods extend into the open holes in a one-to-one correspondence manner.

8. The massager with the kneading function according to claim 7, wherein hinge shafts are formed on the outer sides of the bottom ends of the kneading rods; the hinge shafts are mounted in the hinge positions in a clearance fit manner; a positioning pressing plate is arranged on a bottom side of the top cover; and the positioning pressing plate presses the hinge shafts into the hinge positions.

9. The massager with the kneading function according to claim 1, wherein the soft outer skin is made of medical grade silicone.

* * * * *